(12) United States Patent
Lee

(10) Patent No.: US 10,103,396 B2
(45) Date of Patent: Oct. 16, 2018

(54) APPARATUS AND METHOD FOR CONTROLLING AIR SUPPLY INTO FUEL CELL STACK

(71) Applicant: Hyundai Motor Company, Seoul (KR)

(72) Inventor: Dong Hun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 356 days.

(21) Appl. No.: 14/875,774

(22) Filed: Oct. 6, 2015

(65) Prior Publication Data
US 2016/0359181 A1 Dec. 8, 2016

(30) Foreign Application Priority Data
Jun. 3, 2015 (KR) .......................... 10-2015-0078442

(51) Int. Cl.
| | | |
|---|---|---|
| H01M 8/04746 | (2016.01) | |
| G05B 15/02 | (2006.01) | |
| G05D 7/06 | (2006.01) | |
| H01M 8/04082 | (2016.01) | |
| H01M 8/0438 | (2016.01) | |
| H01M 8/04089 | (2016.01) | |

(52) U.S. Cl.
CPC ........ *H01M 8/04753* (2013.01); *G05B 15/02* (2013.01); *G05D 7/06* (2013.01); *H01M 8/04089* (2013.01); *H01M 8/04201* (2013.01); *H01M 8/04395* (2013.01); *H01M 8/04425* (2013.01); *H01M 8/04776* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 2002/0150802 A1* | 10/2002 | Imamura | ........... | H01M 8/04007 429/413 |
| 2009/0098426 A1* | 4/2009 | Tsuchiya | ............. | H01M 8/0438 429/425 |
| 2009/0325010 A1 | 12/2009 | Kirkun | | |

(Continued)

FOREIGN PATENT DOCUMENTS

| | | |
|---|---|---|
| JP | 2005-079007 A | 3/2005 |
| JP | 2005-129305 A | 5/2005 |

(Continued)

*Primary Examiner* — Tuan C Dao
(74) *Attorney, Agent, or Firm* — Mintz Levin Cohn Ferris Glovsky and Popeo, P.C.; Peter F. Corless

(57) ABSTRACT

An apparatus and a method are provided for controlling an air supply into a fuel cell stack capable of rapidly reducing an air supply up to a required flow rate when it is required to suddenly reduce an air flow rate supplied to the fuel cell stack for a reduction in vehicle power, etc., in a pressurized operation condition. The apparatus includes an air compressor that is configured to compress air and supply the air to a cathode of the fuel cell stack and a back pressure control valve that is installed in a line to which air subjected to reaction in the fuel cell stack is emitted. A controller operates the back pressure control valve and the air compressor based on a current air supply pressure and a required air reduction quantity of the air compressor when required to reduce the air supplied into the fuel cell stack.

11 Claims, 5 Drawing Sheets

(56) References Cited

U.S. PATENT DOCUMENTS

| | | | |
|---|---|---|---|
| 2010/0021783 A1* | 1/2010 | Osada | H01M 8/04089 429/424 |
| 2010/0055522 A1* | 3/2010 | Manabe | B60L 1/003 429/431 |
| 2010/0291452 A1* | 11/2010 | Innanishi | H01M 8/04223 429/432 |
| 2012/0077102 A1* | 3/2012 | Morita | H01M 8/04388 429/429 |
| 2014/0004438 A1* | 1/2014 | Wake | H01M 8/04544 429/444 |
| 2014/0120447 A1 | 5/2014 | Mussro et al. | |

FOREIGN PATENT DOCUMENTS

| | | |
|---|---|---|
| JP | 2012-099220 A | 5/2012 |
| JP | 2014-011090 A | 1/2014 |
| JP | WO 2013/129521 A1 | 7/2015 |
| KR | 10-2009-0017719 A | 2/2009 |
| KR | 2014-0073735 A | 6/2014 |
| KR | 10-2014-0129738 A | 11/2014 |

\* cited by examiner

APPARATUS AND METHOD FOR CONTROLLING AIR SUPPLY INTO FUEL CELL STACK

CROSS REFERENCE TO RELATED APPLICATION

The present application claims the benefit of priority to Korean Patent Application No. 10-2015-0078442 filed Jun. 3, 2015, the entire of which application is incorporated herein for all purposes by this reference.

BACKGROUND

1. Technical Field

The present invention relates to an apparatus and a method for controlling an air supply into a fuel cell stack, and more particularly, to an apparatus and a method for controlling an air supply into a fuel cell stack capable of rapidly reducing an air supply up to a required flow rate when it is required to suddenly reduce a flow rate of air supplied to the fuel cell stack for a sudden reduction in vehicle power, etc., in a pressurized operation condition.

2. Description of the Related Art

A method of operating a fuel cell system applied for fuel cell vehicles is classified into an ambient pressure type and a variable pressure type. In each of the operating methods, an operating pressure of the fuel cell stack is a factor that affects the overall performance of the fuel cell vehicle. Among the fuel cell systems, the ambient pressure fuel cell system uses an air blower which does not require a substantial amount of power to supply ambient pressure air to a cathode of the fuel cell. Considering that power of peripheral devices for supplying air is supplied from the fuel cell stack, the ambient pressure fuel cell system may reduce the power consumption of the peripheral devices. On the other hand, considering that as the operating pressure of the fuel cell stack increases, the efficiency of the fuel cell increases, the low pressure of the fuel cell system may reduce the power density of the fuel cell stack.

Accordingly, the variable pressure fuel cell system has been developed which operates at a substantially low pressure to minimize parasitic power in a low power section to improve the efficiency of the fuel cell system and operates at a substantially high pressure in a high output section to improve the performance of the fuel cell system. The variable pressure fuel cell system uses an air compressor to supply higher-pressure air than the ambient pressure to the cathode and has a separate back pressure control valve mounted within a pipe for gas passing through the fuel cell stack to adjust a pressure of gas supplied to the fuel cell stack.

In response to determining that the state of the fuel cell stack is dry or when high power is required such as high temperature, high output, and a high load, the variable pressure fuel cell system is required to be operated in a high air pressure state. When the vehicle power is suddenly reduced under the operation condition, a vehicle controller is configured to suddenly reduce a speed of the air compressor to suddenly reduce the flow rate of air, thereby preventing the fuel cell stack from drying due to the excessive supply of air.

When the pressure formed by the air previously supplied to the fuel cell during the above process is not reduced (e.g., is maintained or is increased), the air compressor may be operated in a surge region while the flow rate of the air compressor is suddenly reduced. When the air compressor is operated in the surge region, the pressure and the flow rate unstably appear within a cathode pipe. Further, when the air compressor is repeatedly operated in the surge region, the instability of the pressure and the flow rate has an adverse effect on long-term durability of the air compressor and the fuel cell stack and thus the power of the fuel cell stack may be unstable.

SUMMARY

An object of the present invention is to provide an apparatus and a method for controlling an air supply into a fuel cell stack capable of rapidly reducing an air supply up to a required flow rate of air when it is required to suddenly reduce a flow rate of air supplied to the fuel cell stack for a sudden reduction in vehicle power, etc., in a pressurized operation condition.

According to an exemplary embodiment of the present invention, an apparatus for controlling an air supply into a fuel cell stack may include: an air compressor configured to compress air and supply the air to a cathode of the fuel cell stack; a back pressure control valve configured to be installed in a line to which air subjected to reaction in the fuel cell stack is emitted; and a controller configured to operate the back pressure control valve and the air compressor based on a current air supply pressure and a required air reduction quantity of the air compressor when it is required to reduce the air supplied into the fuel cell stack.

Particularly, the controller may be configured to open the back pressure control valve and decelerate the air compressor when a difference between a current air supply pressure of the air compressor and a preset surge reference pressure is less than a preset threshold value. The controller may further be configured to open the back pressure control valve and decelerate the air compressor when the required air reduction quantity is greater than the preset threshold value. The back pressure control valve may be opened at a maximum opening value and the air compressor may be decelerated by regenerative braking.

According to another exemplary embodiment of the present invention, a method for controlling an air supply into a fuel cell stack may include: monitoring a detection of a current air supply pressure of an air compressor supplied to a cathode of the fuel cell stack by compressing air; receiving a required air reduction quantity supplied to the fuel cell stack; and operating the back pressure control valve and the air compressor based on a current air supply pressure of the air compressor detected during the monitoring and the required reduction air quantity input in the receiving of the required air reduction quantity.

In the monitoring process, the current air supply pressure of the air compressor may be compared with a surge reference pressure based on the preset operating region of the air compressor, and in the receiving of the required reduction quantity of air, the required air reduction quantity may be compared with a preset first threshold value. In the operating of the back pressure control valve, when a difference between the current air supply pressure and the surge reference pressure is less than a preset second threshold value and the required air reduction quantity of a flow rate is greater than the first threshold value, the back pressure control valve installed in a line to which air subjected to reaction in the fuel cell stack is emitted may be opened and the air compressor may be decelerated. In addition, the back pressure control valve may first be opened and then the air compressor may be decelerated. The air compressor may be decelerated by regenerative braking.

The method may further include: prior to the valve operation, storing an opening value of the back pressure control valve; and after the valve operate, returning an opening value operating the back pressure control valve to be the opening value stored in the storing of the opening value when the flow rate supplied to the fuel cell stack is reduced based on the required air reduction quantity.

According to yet another exemplary embodiment of the present invention, a method for controlling an air supply into a fuel cell stack may include: opening a back pressure control valve installed in a line to which air subjected to reaction in the fuel cell stack is emitted and decelerating an air compressor based on a current air supply pressure and a required air reduction quantity of the air compressor which compresses air and supplies the compressed air to a cathode of the fuel cell stack, when it is required to reduce the air supplied into the fuel cell stack.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
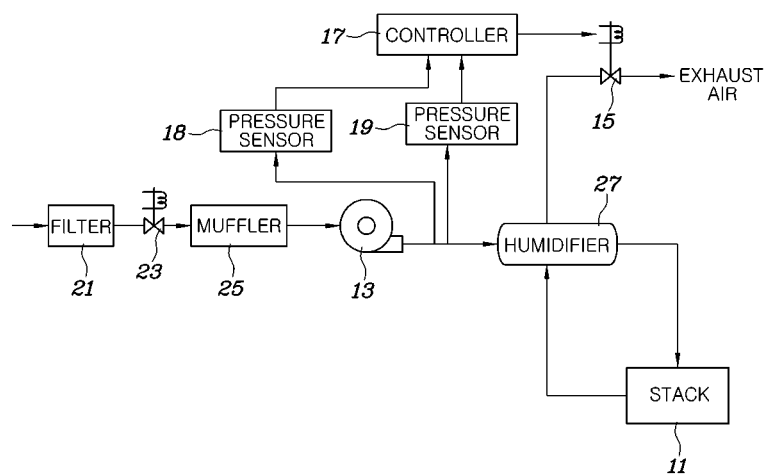
FIG. 1 is a block configuration diagram illustrating an apparatus for controlling an air supply into a fuel cell stack according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an apparatus for controlling air supply into a fuel cell stack according to various exemplary embodiments of the present invention will be described in detail with reference to the accompanying drawings.

FIG. 1 is a block configuration diagram illustrating an apparatus for controlling an air supply into a fuel cell stack according to an exemplary embodiment of the present invention. Referring to FIG. 1, the apparatus for controlling an air supply into a fuel cell stack according to the exemplary embodiment of the present invention may include a fuel cell stack 11, an air compressor 13 configured to compress air and supply the compressed air to a cathode of the fuel cell stack 11, a back pressure control valve 15 installed in a line to which air subjected to reaction in a fuel cell stack 10 is emitted, and a controller 17 configured to operate the air compressor 13 and the back pressure control valve 15 based on a current air supply pressure and a required air reduction quantity of a flow rate of an air compressor 13 when it is required to reduce a flow rate of the air supplied into the fuel cell stack 10.

In addition, the apparatus may further include a flow sensor 18 and a pressure sensor 19 configured to detect a flow rate and a pressure of air supplied from the air compressor 13, respectively. A variable pressure fuel cell system according to the exemplary embodiment of the present invention may further include a filter 21 configured to filter foreign substances in external air, an air shut-off valve 23 installed in an air output line of the filter 21, a muffler 25 configured to pass the air provided through the air shut-off valve 23 to the air compressor 13 while removing noise generated from the supplied air, and a humidifier 27 configured to humidify the air supplied from the air compressor 13 to the cathode. Generally, wet air subjected to reaction in the fuel cell stack 11 may be emitted by passing through the humidifier 13.

Figure 2:
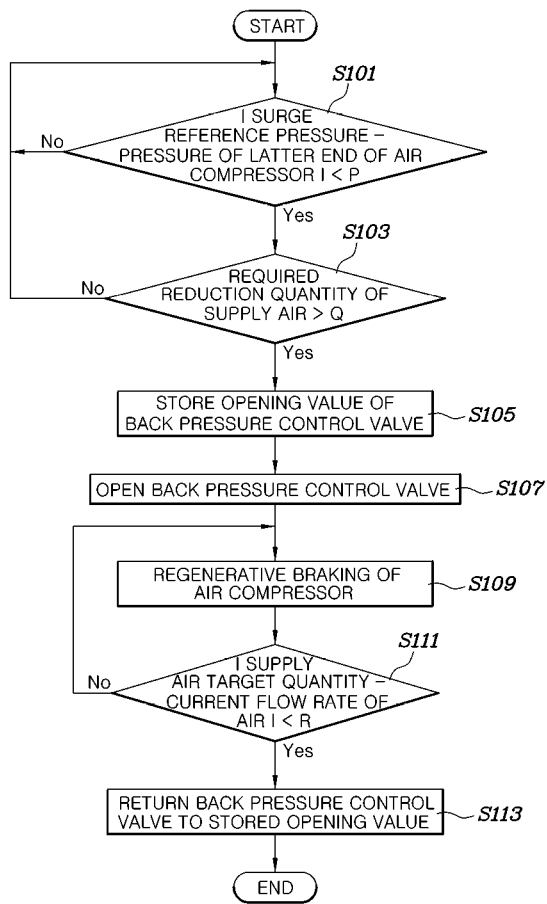
FIG. 2 is a flow chart illustrating a method for controlling an air supply into a fuel cell stack according to an exemplary embodiment of the present invention.

A method for controlling supply air into a fuel cell stack according to an exemplary embodiment of the present invention based on the foregoing configuration will be described below. FIG. 2 is a flow chart illustrating a method for controlling an air supply into a fuel cell stack according to an exemplary embodiment of the present invention.

Referring to FIG. 2, the method for controlling supply air into a fuel cell stack according to an exemplary embodiment of the present invention may include: monitoring, by a controller 17, a pressure of air supplied from the air compressor 13 (S101). In particular, the controller 17 may be configured to determine whether a difference between a surge reference pressure of the air compressor based on previously determined operation characteristics of the air compressor 13 and a pressure of air actually supplied from the air compressor 13 is less than a preset threshold value P (S101). The pressure of air supplied from the air compressor 13 may be detected by the pressure sensor 19 installed at an end of the air compressor 13 and then supplied to the controller 17. Further, a surge reference pressure based on the previously determined operation characteristics of the air compressor 13 may be input to the controller 17 from the exterior or may be stored in the controller 17.

In step (S101), the controller 17 may be configured to compare a surge reference pressure with the pressure of air supplied from the air compressor 13 to determine similarities between the pressure of air supplied from the air compressor 17 and the surge reference pressure. In other words, as the difference between the surge reference pressure and the pressure of air supplied from the air compressor 13 is reduced, the pressure of air supplied from the air compressor 13 may be determined to be similar to (e.g., about the same as) the surge region of the air compressor 13 and air may be supplied at a substantially high pressure.

The controller 17 may be configured to receive a command to reduce a flow rate of air including a supply air target quantity reduced to reduce vehicle power from the exterior. In particular, the controller 17 may be configured to compare the reduced supply air target quantity with the current supply air target quantity to calculate the required supply air reduction quantity which is the flow rate of air to be reduced. The controller 17 may also be configured to determine whether the required supply air reduction quantity is greater than a preset threshold value Q (S103). In other words, when receiving the command to reduce a flow rate of air to reduce power while the air compressor 13 is operated at a high pressure about the same as the surge reference pressure, the controller 17 may be configured to determine that the required supply air reduction quantity to be reduced is greater than the preset threshold value Q (S103).

In the step (S103), the controller 17 may be configured to determine a volume of the required supply air reduction quantity. In the step (S103), the fact that the required supply air reduction quantity is greater than the preset threshold value Q may indicate that the flow rate of air to be reduced is substantial, indicating that the flow rate of air is required to be rapidly reduced. Additionally, the controller 105 may be configured to store an opening value of a current back pressure control valve prior to operating the air compressor 13 and the back pressure control valve 15 to reduce the flow rate of air (S105). In step (S105), when a control to pressurize the air compressor 13 is required to be repeated after the control to reduce a flow rate of air is performed, the air compressor 13 may return to a pressurized operation condition. When other control techniques to return the air compressor 13 to the pressurized operation condition are applied, the step (S105) may be omitted.

Furthermore, the controller 105 may be configured to open the back pressure control valve 15 (S107) and decelerate the air compressor 13 to reduce the pressure of air supplied to the fuel cell stack 11 (S109). In the opening of the back pressure control valve 15 (S107), the controller 105 may be configured to operate the back pressure control valve 15 to have an opening value greater than that of the current back pressure control valve 107. Additionally, the sudden reduction in flow rate is implemented when the air compressor 13 is in the high pressure operation state, in step (S107), the back pressure control valve 15 may be operated to have a maximum opening value to maximally emit air (e.g., emit a maximum amount of air).

In step (S109) of decelerating the air compressor 13, the motor rotating speed of the air compressor 13 may be reduced, and thus the pressure of supplied air may be reduced to decrease the air flow rate. Additionally, in step (S109), the regenerative braking may be performed on the air compressor 13 to decelerate the motor rotating speed of the air compressor 13. In step (S109), it may be possible to recover energy by performing the regenerative braking to decelerate the motor.

In the opening of the back pressure control valve 15 (S107) and the decelerating of the air compressor 13 (S108), any one of the step (S107) and the step (S108) first starts or the steps (S107 and S108) may be simultaneously performed. However, the step (S107) needs to start after the step (S109) starts. In other words, when the deceleration of the air compressor 13 is sustained for a predetermined time or greater and the back pressure control valve 15 remains closed, since air remains within a cathode exhaust line of the fuel cell stack 11, the pressure reduction is not rapidly performed, and the air compressor 13 may be operated in the surge region.

However, first starting the operation of opening the back pressure control valve 15 (S107) to reducing the back pressure of the cathode of the fuel cell stack 11 is advantageous in surge prevention stability. In other words, after the opening of the back pressure control valve 15 (S107) first starts to space apart an operating point of the air compressor 13 from the surge region, and the pressure may be reduced in the decelerating of the air compressor 13 (S108) to further reduce the risk of surge occurrence.

Moreover, the controller 17 may be configured to compare the supply air target quantity input in step (S103) with the current flow rate of air to reduce power and determine whether the difference is less than the preset threshold value R (S111). In the step (S111), a control may be performed to reduce the flow rate in response to the reduction in vehicle power as described above to determine whether the flow rate of air currently supplied to the fuel cell stack is substantially the same as the supply air target quantity. In the step (S111), the applied threshold value R may be a reference value used to determine that the supply air target quantity is substantially the same as the current flow rate of air.

The step (S109) of decelerating the rotation of the air compressor 13 may be repeated until the supply air target quantity is substantially the same as the current flow rate of air in the step (S111). In response to determining that the supply air target quantity is substantially the same as the current flow rate of air in the step (S111), the controller 17 may be configured to adjust the opening value of the back pressure control valve 15 to be the stored opening value in the step (S105) and may return the fuel cell system to the pressured operation condition.

In the apparatus and method for controlling an air supply into a fuel cell stack according to the exemplary embodiment of the present invention, when the flow rate of supply air is required to be rapidly or suddenly reduced to reduce the vehicle power in the fuel cell system which is in the pressurized operation state, the air compressor 13 may quickly set the flow rate of supply air to be the required supply air reduction quantity in the operating region in which it is not in a surge state. Further, it may be possible to maximally recover the energy by the regenerative braking of the air compressor.

Figure 3:
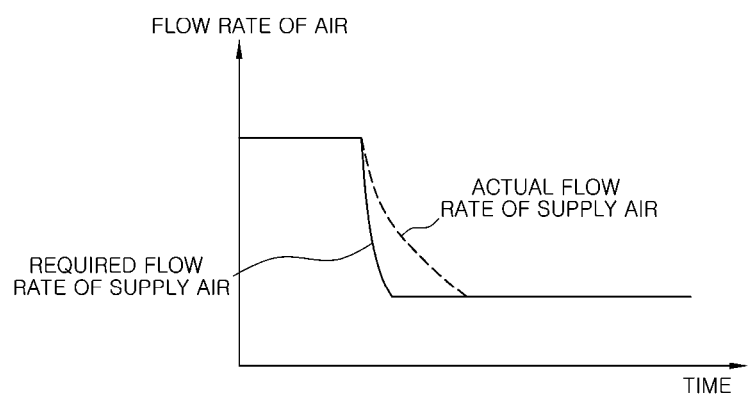
FIG. 3 is a graph illustrating a difference between a flow rate of supply air required in a vehicle and an actual flow rate of supply air while suddenly reducing the flow rate of air supplied into the fuel cell stack in a pressurized operation state according to the related art.

FIG. 3 is a graph illustrating a difference between a flow rate of supply air required in a vehicle and an actual flow rate of supply air according to the related art while suddenly reducing the flow rate of air supplied into the fuel cell stack in a pressurized operation state.

Referring to FIG. 3, when the sudden reduction in flow rate is required, the vehicle requires the reduction in air flow rate supplied over a short period of time as illustrated by a solid line. However, when suddenly reducing the speed of the air compressor to correspond to the required flow rate of supply air as illustrated by a solid line, a surge may occur in an air supply pipe. Accordingly, the related art demonstrates the slow reduction of the actual flow rate of supply air as illustrated by a dotted line to prevent the surge from occurring. When slowly reducing the air flow rate as in the related art, the fuel cell stack is further dried by the excessive supply of air and thus, the performance of the fuel cell stack may deteriorate and the energy recovery quantity which may be recovered by the motor regenerative braking when the speed of the air compressor is reduced and thus the system efficiency may be reduced.

Conversely, according to the exemplary embodiment of the present invention, the sudden reduction in the air flow rate may be realized as illustrated by a solid line of FIG. 3 and therefore the problem of the related art may be solved. The effect will be clearer from the following description of FIGS. 4 and 5.

Figure 4:
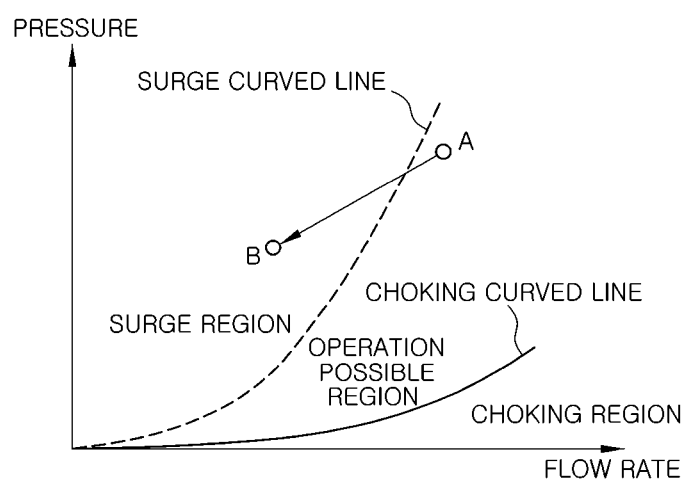
FIGS. 4 and 5 are diagrams for comparing an operating region of an air compressor while suddenly reducing the flow rate of air supplied into the fuel cell stack in the pressurized operation state according to an exemplary embodiment of the present invention.
Figure 5:
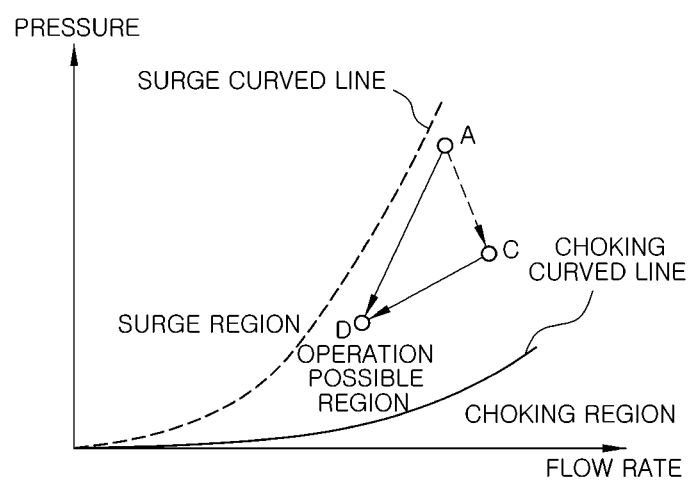

FIGS. 4 and 5 are diagrams comparing an operating region of an air compressor while suddenly reducing the flow rate of air supplied into the fuel cell stack in the pressurized operation state. FIG. 4 illustrates the case of controlling a flow rate by reducing the speed of the air compressor 13. When the speed of the air compressor 13 is suddenly reduced to reduce the flow rate at an operating point A of the air compressor during the pressurized operation, an operating point B of the air compressor may be formed in the surge region and thus the problem described above may occur.

To solve the occurrence of such a problem, according to the exemplary embodiment of the present invention, the back pressure control valve 15 may be opened based a reduced speed of the air compressor 13 to decrease a difference pressure of the cathode, thereby spacing the operating point of the air compressor 13 apart from the surge curved line up to the operating point marked by 'C' of FIG. 5. Since the difference pressure of the cathode may be reduced when opening the back pressure control valve 15, even though the operating speed of the air compressor 13 is suddenly reduced, the air compressor may be stably operated without deviation of the operating point D of the air compressor toward the surge region.

Further, when the control is performed as illustrated in FIG. 5, the air load generated in the cathode pipe may be reduced in response to the opening of the back pressure control valve 15 to maximally recover the energy by the motor regenerative braking of the air compressor 13 and the recovered energy may be stored in the battery, thereby improving the efficiency of the fuel cell system. In particular, when the variable pressure fuel cell system, the air compressor 13 consumes energy of about 10% or greater at the maximum power operation condition of the fuel cell, and therefore the energy which may be recovered by the regenerative braking during the reduction in the flow rate of air has a substantial effect on the improvement in the system efficiency.

As described above, according to the exemplary embodiments of the present invention, the apparatus and the method for controlling an air supply into a fuel cell stack may open the back pressure control valve of line to which air is exhausted to decelerate the air compressor while reducing the pressure of previously supplied air when the flow rate of supply air is required to be suddenly reduced to reduce the vehicle power in the fuel cell system which is in the pressurized operation state, thereby preventing the air compressor from being operated in the surge region. Accordingly, the air compressor may suddenly reduce the flow rate without being operated in the surge region to prevent the fuel cell stack from drying out, thereby preventing the stack performance from deteriorating. Further, the apparatus and the method for controlling an air supply into a fuel cell stack may reduce the air load generated in the cathode pipe based on the opening of the back pressure control valve to maximally recover energy based on the motor regenerative braking of the air compressor, thereby substantially improving the efficiency of the fuel cell system.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method for controlling an air supply into a fuel cell stack, comprising:
   monitoring, by a controller, a detection of a current air supply pressure of an air compressor supplied to a cathode of the fuel cell stack by compressing air;
   receiving, by the controller, a required reduction quantity of air supplied to the fuel cell stack;
   operating, by the controller, a back pressure control valve and an air compressor based on a current air supply pressure of the air compressor detected while monitoring the current air supply pressure and the required reduction quantity of air input in the receiving of the required air reduction quantity; and
   controlling, by the controller, the air supply into the fuel cell stack to be reduced rapidly up to a required flow rate of air when sudden reduction of flow rate of air is required,
   wherein in the monitoring process, the current supply pressure of air of the air compressor is compared with a surge reference pressure based on a preset operating region of the air compressor, and in the receiving of the required air reduction quantity, the required reduction quantity of air is compared with a preset first threshold value, and
   wherein when a difference between the current air supply pressure and the surge reference pressure is less than a preset second threshold value and the required reduction quantity of a flow rate of air is greater than the first threshold value, the back pressure control valve installed in a line to which air subjected to reaction in the fuel cell stack is emitted is opened and the air compressor is decelerated.

2. The method of claim 1, wherein the back pressure control valve is first opened and then the air compressor is decelerated.

3. The method of claim 1, wherein the air compressor is decelerated by regenerative braking.

4. The method of claim 1, further comprising:
prior to operating the back pressure control valve, storing, by the controller, an opening value of the back pressure control valve; and
after the operating the back pressure control valve, returning, by the controller, an opening value controlling the back pressure control valve to have the opening value stored in the storing of the opening value when the flow rate supplied to the fuel cell stack is reduced based on the required air reduction quantity.

5. An apparatus for controlling an air supply into a fuel cell stack using the method according to claim 1, comprising:
an air compressor configured to compress air and supply the air to a cathode of the fuel cell stack;
a back pressure control valve installed in a line to which air subjected to reaction in the fuel cell stack is emitted; and
a controller configured to operate the back pressure control valve and the air compressor based on a current air supply pressure and a required air reduction quantity of the air compressor when it is required to reduce the air supplied into the fuel cell stack.

6. The apparatus of claim 5, wherein the controller is configured to open the back pressure control valve and decelerate the air compressor when the required air reduction quantity is greater than the preset threshold value.

7. The apparatus of claim 6, wherein the controller is configured to open the back pressure control valve to a maximum opening value.

8. The apparatus of claim 5, wherein the controller is configured to open the back pressure control valve to a maximum opening value.

9. The apparatus of claim 5, wherein the air compressor is decelerated by regenerative braking.

10. A non-transitory computer readable medium containing program instructions executed by a controller, the computer readable medium comprising:
program instructions that monitor a detection of a current air supply pressure of an air compressor supplied to a cathode of a fuel cell stack by compressing air;
program instructions that receive a required reduction quantity of air supplied to the fuel cell stack;
program instructions that operate a back pressure control valve and an air compressor based on a current air supply pressure of the air compressor detected while monitoring the current air supply pressure and the required reduction quantity of air input in the receiving of the required air reduction quantity;
program instructions that control an air supply into the fuel cell stack to be reduced rapidly up to a required flow rate of air when sudden reduction of flow rate of air is required; and
program instructions that compare the current supply pressure of air of the air compressor with a surge reference pressure based on the preset operating region of the air compressor, and compare the required reduction quantity of air with a preset first threshold value,
wherein when a difference between the current air supply pressure and the surge reference pressure is less than a preset second threshold value and the required reduction quantity of a flow rate of air is greater than the first threshold value, the back pressure control valve installed in a line to which air subjected to reaction in the fuel cell stack is emitted is opened and the air compressor is decelerated.

11. The non-transitory computer readable medium of claim 10, further comprising:
program instructions that store an opening value of the back pressure control valve prior to operating the back pressure control valve; and
program instructions that return an opening value controlling the back pressure control valve to have the opening value stored in the storing of the opening value when the flow rate supplied to the fuel cell stack is reduced based on the required air reduction quantity after the operating the back pressure control valve.

* * * * *